US011338218B2

(12) United States Patent
Clegg et al.

(10) Patent No.: US 11,338,218 B2
(45) Date of Patent: May 24, 2022

(54) FLUID TREATMENT APPARATUS AND METHODS

(71) Applicant: Purestream Services, LLC, Salt Lake City, UT (US)

(72) Inventors: Benjamin Clegg, Salt Lake City, UT (US); Neil Richardson, Salt Lake City, UT (US); Ryan Mawson, Salt Lake City, UT (US); Brian Busath, Salt Lake City, UT (US)

(73) Assignee: Purestream Services, LLC, Salt Lake City, UT (US)

( * ) Notice: Subject to any disclaimer, the term of this patent is extended or adjusted under 35 U.S.C. 154(b) by 0 days.

(21) Appl. No.: 17/195,159

(22) Filed: Mar. 8, 2021

(65) Prior Publication Data

US 2021/0187410 A1   Jun. 24, 2021

Related U.S. Application Data

(63) Continuation of application No. 16/111,551, filed on Aug. 24, 2018, now Pat. No. 10,974,161.

(60) Provisional application No. 62/560,916, filed on Sep. 20, 2017.

(51) Int. Cl.

| *B01D 1/14* | (2006.01) |
|---|---|
| *C02F 1/06* | (2006.01) |
| *B01D 1/16* | (2006.01) |
| *B01D 1/20* | (2006.01) |
| *C02F 1/12* | (2006.01) |
| *C02F 103/10* | (2006.01) |

(52) U.S. Cl.
CPC ............... *B01D 1/14* (2013.01); *B01D 1/16* (2013.01); *B01D 1/20* (2013.01); *C02F 1/06* (2013.01); *C02F 1/12* (2013.01); *C02F 2103/10* (2013.01); *C02F 2301/026* (2013.01)

(58) Field of Classification Search
CPC .... B01D 1/14; B01D 1/16; B01D 1/20; C02F 1/06; C02F 1/12; C02F 2103/10; C02F 2301/026
See application file for complete search history.

(56) References Cited

U.S. PATENT DOCUMENTS

| 1,830,174 A | 11/1931 | Peebles |
| 2,640,761 A | 6/1953 | Wiseman |
| 3,212,559 A | 10/1965 | Williamson |
| 3,595,297 A | 7/1971 | Berg |
| 3,622,511 A | 11/1971 | Pizzo et al. |
| 3,870,585 A | 3/1975 | Kearns et al. |

(Continued)

FOREIGN PATENT DOCUMENTS

| GB | 2268418 A | 1/1994 |
| JP | 2001009444 A | 1/2011 |

(Continued)

OTHER PUBLICATIONS

International Search Report dated Dec. 10, 2018, in International Application No. PCT/US2018/047873, filed Aug. 24, 2018; 7 pages.

*Primary Examiner* — Jonathan Miller
(74) *Attorney, Agent, or Firm* — Thorpe North & Western, LLP

(57) ABSTRACT

A system for concentrating wastewater with a heated gas is disclosed wherein a heated gas directed into a wastewater heating chamber having a cooling assembly for minimizing scale buildup.

20 Claims, 15 Drawing Sheets

(56) References Cited

U.S. PATENT DOCUMENTS

| | | | |
|---|---|---|---|
| 3,895,994 A | 7/1975 | Saguchi et al. | |
| 3,925,149 A | 12/1975 | Erwin | |
| 3,974,021 A | 8/1976 | Bernadiner et al. | |
| 4,287,019 A | 9/1981 | Standiford | |
| 4,683,025 A | 7/1987 | Flores | |
| 4,731,164 A | 3/1988 | Williamsom | |
| 4,838,184 A * | 6/1989 | Young | F23G 7/14 405/129.27 |
| 4,970,030 A | 11/1990 | Prudhon et al. | |
| 5,082,525 A | 1/1992 | Travis | |
| 5,849,148 A | 12/1998 | Walker | |
| 5,983,842 A | 11/1999 | Nishi | |
| 6,555,076 B1 | 4/2003 | Droy et al. | |
| 6,958,107 B1 | 10/2005 | Clarke et al. | |
| 8,408,197 B2 | 4/2013 | Cowles | |
| 8,425,664 B2 | 4/2013 | Batty et al. | |
| 8,425,666 B2 | 4/2013 | Batty et al. | |
| 8,741,100 B2 * | 6/2014 | Duesel, Jr. | C02F 1/048 96/275 |
| 8,741,101 B2 | 6/2014 | Duesel, Jr. | |
| 8,790,496 B2 | 7/2014 | Duesel, Jr. et al. | |
| 9,975,061 B2 * | 5/2018 | Keckler, III | B01D 3/4216 |
| 10,807,884 B2 * | 10/2020 | Shrader | B01D 1/14 |
| 10,974,161 B2 * | 4/2021 | Clegg | B01D 1/14 |
| 2008/0173031 A1 | 7/2008 | Duesel et al. | |
| 2010/0175983 A1 | 7/2010 | Batty et al. | |
| 2011/0061816 A1 | 3/2011 | Duesel, Jr. et al. | |
| 2011/0303367 A1 | 12/2011 | Panz et al. | |
| 2017/0138588 A1 | 5/2017 | Van Bockryck et al. | |

FOREIGN PATENT DOCUMENTS

| | | |
|---|---|---|
| JP | 2014000528 A | 1/2014 |
| JP | 2014004498 A | 1/2014 |
| KR | 10-20110016307 A | 2/2011 |
| SU | 1423140 A1 | 9/1988 |
| WO | WO 2009153403 A1 | 12/2009 |

\* cited by examiner

FLUID TREATMENT APPARATUS AND METHODS

PRIORITY CLAIM

This application claims priority to U.S. Ser. No. 62/560,916 filed on Sep. 20, 2017 entitled "Fluid Treatment Systems and Methods" and U.S. Ser. No. 16/111,551 filed on Aug. 24, 2018 entitled "Fluid Treatment Systems" which are incorporated herein by reference in its entirety.

FIELD OF THE INVENTION

The present invention relates to the treatment of fluid waste streams and in particular, methods and apparatus of concentrating fluid waste streams.

BACKGROUND

The disposal of wastewater from manufacturing, municipal waste, or industrial processes is costly. In the oil industry, for example, produced water is a term used to describe water that is produced along with the oil and gas. Produced water may come from various sources. For example, oil and gas reservoirs have a natural water layer that lies under the hydrocarbons. Also, water may be injected into reservoirs to help force oil to the surface. This water is produced along with the oil and/or gas when the latter is extracted. Produced water is considered an industrial waste, and therefore, careful disposal is necessary. Historically, produced water was disposed of in large evaporation ponds. However, this has become an increasingly unacceptable disposal method from both environmental and social perspectives. The broad management options for produced water include direct injection, environmentally acceptable direct-use of untreated water, or treatment to a standard defined by the U.S. Environmental Protection Agency (EPA) before disposal or supply to users.

Management of all types of waste water can be problematic. For example, disposal through direct injection may not be feasible. Typically, large-scale on-site storage and/or disposal require significant investment costs towards large and expensive infrastructure. Trucking water off-site for disposal involves high transport costs. Therefore, cost efficient, on-site solutions to waste water disposal and management are sought. Evaporation technologies are known in the art, but current designs have significant drawbacks. For example, waste water can be evaporated evaporation ponds. While relatively low-cost, these ponds still create relatively large surface-area disturbance and they may also be unattractive and/or harmful to wildlife.

Also, water may be sprayed into the atmosphere through portable misting towers. But, misting can lead to salt damage to soil and vegetation. Evaporation may be achieved by introducing thermal elements into smaller volumes of water to speed evaporation. But, the resulting precipitates can create scaling which adheres to heating elements over time, reduces efficiency, and creates maintenance issues. Therefore, efficient and environmentally safe solutions for the evaporative disposal of waste water are elusive.

DESCRIPTION OF EMBODIMENTS

Figure 1:
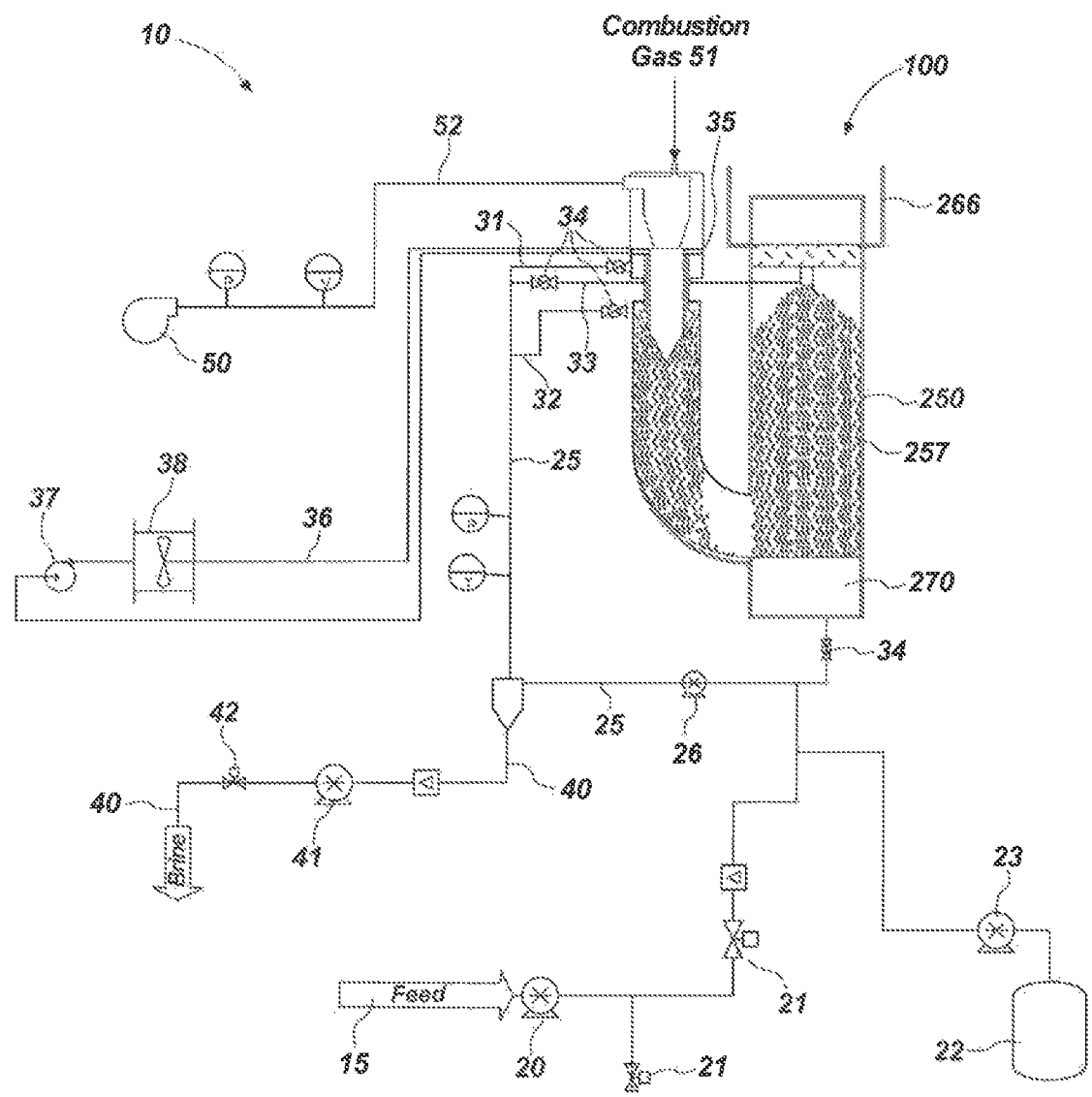
FIG. 1 is a schematic block diagram illustrating a system for purifying a waste stream according to an aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a line" includes a plurality of such lines.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including,"

in this specification it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.8, 3, 3.1, 4, 4.6, and 5, individually.

This same principle applies to ranges reciting only one numerical value as a minimum or a maximum. Furthermore, such an interpretation should apply regardless of the breadth of the range or the characteristics being described.

As used herein, "enhanced," "improved," "performance-enhanced," "upgraded," "improvement," and the like, when used in connection with the description of a device, component, or process, refers to a characteristic of the device, component or process that provides measurably better form, function, or outcome as compared to previously known devices or processes. This applies both to the form and function of individual components in a device or process, as well as to such devices or processes as a whole.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

The process of generated fluid drops from a flow of wastewater can be characterized as atomization. The process begins by forcing liquid through an opening or nozzle. The potential energy of the liquid along with the geometry of the nozzle causes the liquid to emerge as small "ligaments" or "large pieces" of water held together by the hydrogen bonding forces. These ligaments then break up further into very "small pieces" usually called drops, droplets or liquid particles. Each output from a nozzle provides a range of drop sizes referred to as a drop size distribution. Various nozzles have different shaped orifices and produce various spray patterns such as a hollow cone, full cone, flat spray and others known in the art. The drop size distribution depends on nozzle geometry, fluid composition, fluid pressure at the nozzle, and spray angle. The term water ligament as used herein is synonymous with a water drop having a Sauter Mean Diameter ("SMD") greater than 900 micrometers. These are larger than what most would consider a conventional drop and are thus may be referred to as ligaments as well as drops herein. The SMD of a wastewater stream herein may be defined as the diameter of a drop having the same volume/surface area ratio as the entire spray or as the diameter of a sphere that has the same volume/surface area ratio as a particle of interest. SMD is typically defined in terms of the surface diameter, ds:

$$d_s = \sqrt{\frac{A_p}{\pi}}$$

and volume diameter, dv:

$$d_v = \left(\frac{6V_p}{\pi}\right)^{1/3}$$

where Ap and Vp are the surface area and volume of the particle, respectively. If ds and dv are measured directly by other means without knowledge of Ap or Vp, Sauter diameter for a given particle is $$SD = D[3, 2] = d_{32} = \frac{d_v^3}{d_s^2}$$

If the actual surface area, Ap and volume, Vp of the particle are known the equation simplifies further:

$$\frac{V_p}{A_p} = \frac{\frac{4}{3}\pi(d_v/2)^3}{4\pi(d_s/2)^2} = \frac{(d_v/2)^3}{3(d_s/2)^2} = \frac{d_{32}}{6}$$

$$d_{32} = 6\frac{V_p}{A_p}$$

The SMD is usually taken as the mean of several measurements.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

Broadly speaking, aspects of the current technology operate to increase the concentration of total dissolved solids within the fluids of a liquid waste stream. The use of heat to treat the liquid waste stream in an effort to enhance evaporative forces results in the separation of treated water from a waste stream (in the form of steam) leaving a concentrated waste product for disposal. The waste water may be the product of manufacturing processes, municipal waste, or industrial waste water. In one aspect of the technology, the concentrated waste product is referred to as brine or concentrated effluent. Apertures are disposed on a top side of an elongate tubular member at an angle which is designed to induce a spiraling effect or liquid vortex about the interior of the tubular member as liquid waste is injected in the slits and gravity draws the waste downward in the tubular member. A heating device is disposed atop the tubular member and produces heat sufficient to evaporate a portion of the liquid waste (e.g., waste water). While waste water is specifically referenced herein, one of ordinary skill in the art will recognize that any fluid that is susceptible to concentration via evaporation may be used in connection with the present invention. The spiraling or vortex effect that is created by pumping fluids through the apertures creates a mechanism that increases the amount of time any particular discrete volume of waste water is subjected to evaporative heat within the same length of pipe or tubing. See, e.g., U.S. Pat. No. 9,238,181, incorporated herein in its entirety by reference. The spiraling or vortex effect reduces the likelihood of scale formation because of a "scrubbing" effect or "constant wetting" about the sides of the pipe or tubing. That is, the velocity of the waste water within the tube is such that the formation of precipitation on the interior of the pipe is minimized.

Evaporation of water from the waste stream occurs when molecules in the waste stream get enough energy from heat to escape the liquid. They get this heat from motion, but more from a heated air stream combined with the waste liquid. An increased surface area means that more liquid will be exposed to air at one time, and therefore, more water can evaporate in a given time period. Thus one would be inclined to increase the total surface area of the liquid waste stream by making the water particles as small as possible. However, the turbulence generated from the spiraling or vortex effect and/or the evaporative forces acting on the waste stream can "flash evaporate" water droplets creating a small or microparticle of solid waste (e.g., a salt crystal). These small particles become entrained in the gaseous or steam (i.e., the treated) effluent creating unwanted materials in a clean or treated effluent that would otherwise be captured for re-use or discharged into the atmosphere.

Aspects of the present technology operate to optimize the size of water droplets to minimize flash evaporation of the water droplets and the creation of micro-particulate waste entrained in the treated effluent. In one aspect of the technology, a first volume of waste water is introduced into a heating chamber and gravity fed into a second chamber. As the first volume of waste water enters into the heating chamber and interacts with a stream of heated air, the first volume of waste water comprises a turbulent flow. As the first volume of waste water passes from the first chamber to the second chamber, a second volume of waste water is introduced into the waste stream. The second volume of waste water comprises a "smooth" or less turbulent flow. When the second volume of waste water contacts the first volume of waste water, the turbulence of the first volume "sheers" the second volume of waste water into water ligaments or large water droplets. Those large water droplets or water ligaments absorb energy from the heated air stream and promote evaporation of the water from the water droplets/ligaments without flash evaporating so much water from the water droplet/ligament that particulate waste is generated.

Aspects of the technology are also directed towards minimizing the formation of scale that can accumulate when waste water enters a heating chamber. In certain aspects, when waste water enters a heating chamber it has a propensity to evaporate leaving small accumulations of particulate matter on portions of the heating chamber. Over time, the particulate matter aggregates into a solid nodule or mass about an inside surface of the heating chamber. That nodule or mass interferes with the flow of waste water as it enters the heating chamber and can also be broken off and enter the treatment train as an unwanted mass of particulates. A cooling apparatus is used to minimize the flash evaporation of the waste water as it enters the heating chamber. The cooling apparatus controls and regulates particulate accumulation while allowing the waste water to enter the treatment train at an optimized flow geometry and velocity.

Referring to FIG. 1 there is shown a generalized schematic block diagram illustrating one embodiment of a system 10 for purifying or concentrating a waste fluid stream. The system 10 generally includes a feed tank (not shown) holding the waste fluid (e.g. waste water from an industrial process, such as an oilfield process) to be treated, although any other supply of waste fluid or other solution to be purified, for example, salt water, may be used. The waste fluid enters as a waste fluid stream (or feed stream) 15 and, in some examples, can be supplied by a feed pump 20. The waste fluid stream 15 may be from any oilfield process, industrial process, power generation, landfill leachate, and/or naturally occurring water source. The feed pump 20 propagates the waste fluid stream 15 into the concentrated stream 25 (or recycling stream) which can be controlled by one or more valves 21. An optional chemical treatment (e.g., defoamer, lime, etc.) 22 may be incorporated into the feed stream 15 through a chemical feed pump 23 or other mechanical means. The concentrated stream 25 is coupled to a recycle pump 26 which directs concentrated waste to a discharge stream 40 via a discharge pump 41. The discharge stream 40 can also be regulated by a valve 42. The recycle pump 26 also directs concentrated waste through the concentrated stream 25. The concentrated stream 25 comprises three separate streams directed to discrete components of the evaporator apparatus 100 (described in greater detail below). The three separate streams comprise a first stream 31 for injection into a side portion of the evaporator apparatus to create a circular or rotating flow about a first heating chamber. A second stream 32 is injected into a second heating chamber disposed below the first heating chamber (or after the first heating chamber within the treatment train). In one aspect of the technology, the second stream 32 is intended to comprise an annular curtain or sheet of waste fluid. A third stream 33 is directed towards a nozzle within a vertical stack. Each of these streams can be regulated by use of valves 34. In one aspect, a cooling fluid is circulated through certain component parts (a cooling ring 35, e.g.) of the evaporator apparatus through cooling stream 36. A pump 37 is used to circulate the cooling fluid and a fan 38 is used to assist in the removal of heat from the cooling fluid. Heat is provided to the evaporator apparatus 100 by way of a combustion air blower 50 and source of combustion gas 51. Temperature, pressure, and flow meters are all utilized throughout the system 10.

Figure 2:
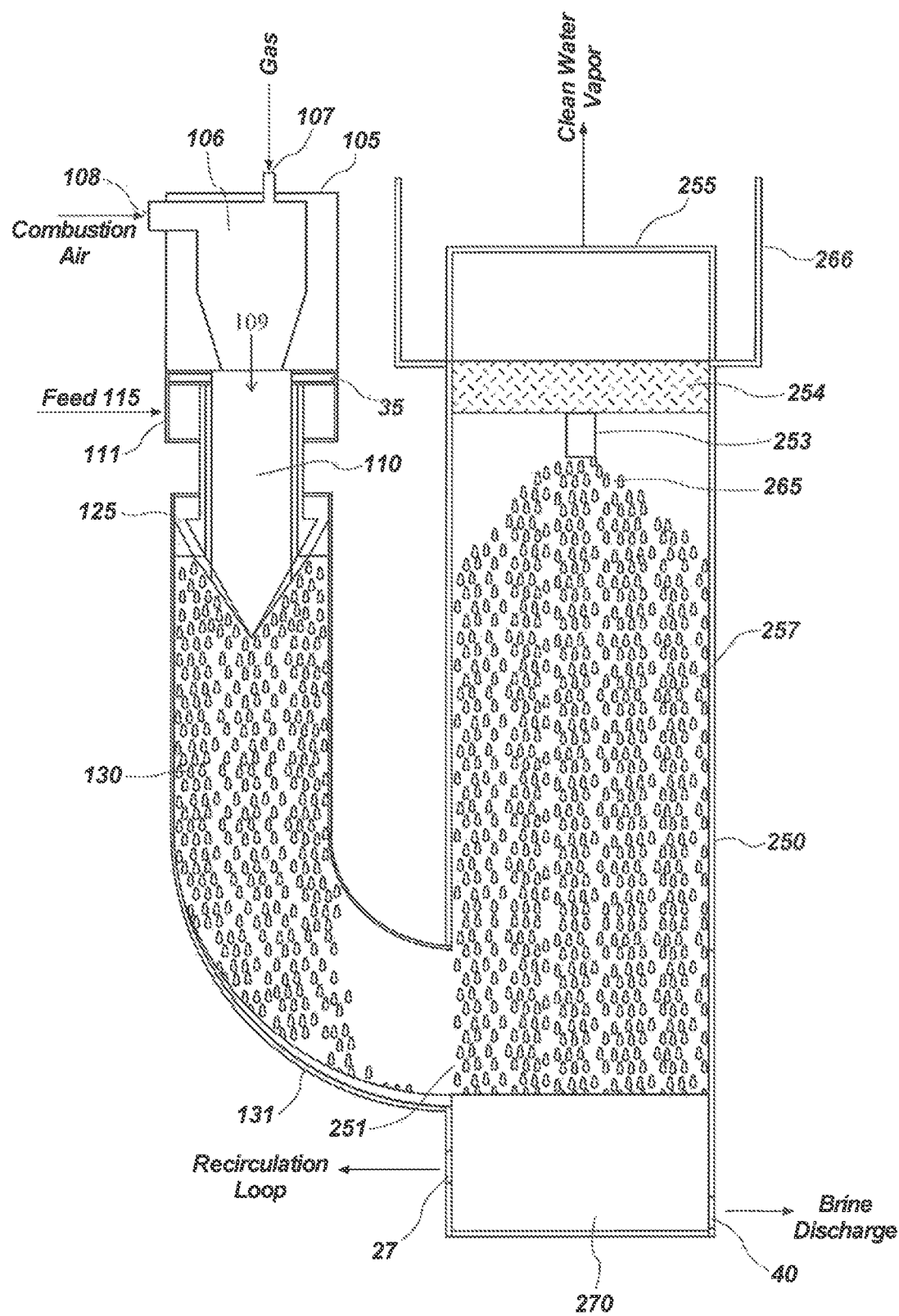
FIG. 2 is a close up view of a block diagram of an evaporator apparatus in accordance with one aspect of the technology.
Figure 3:
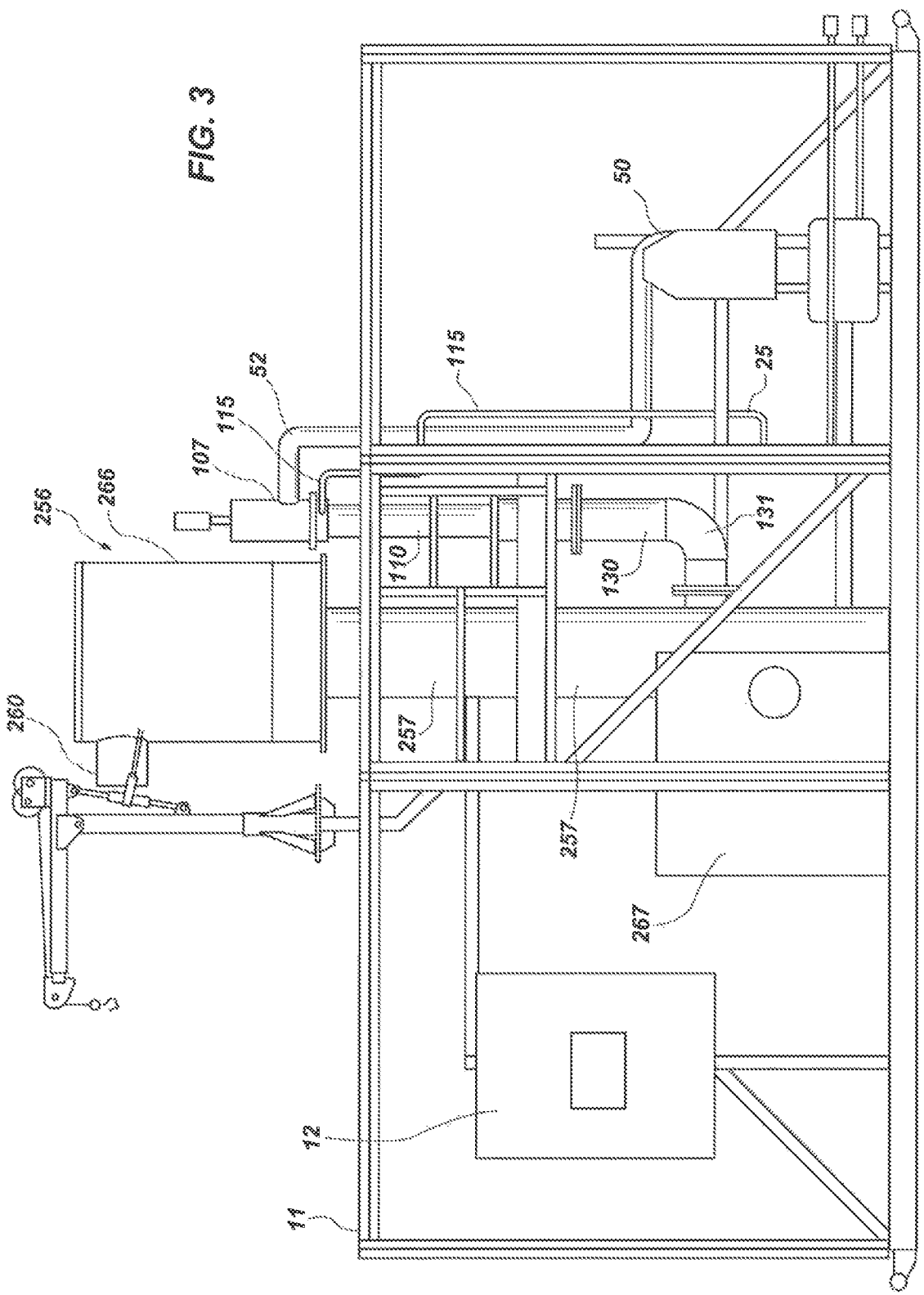
FIG. 3 is a front view of a system for purifying a waste stream in one aspect of the technology.
Figure 4:
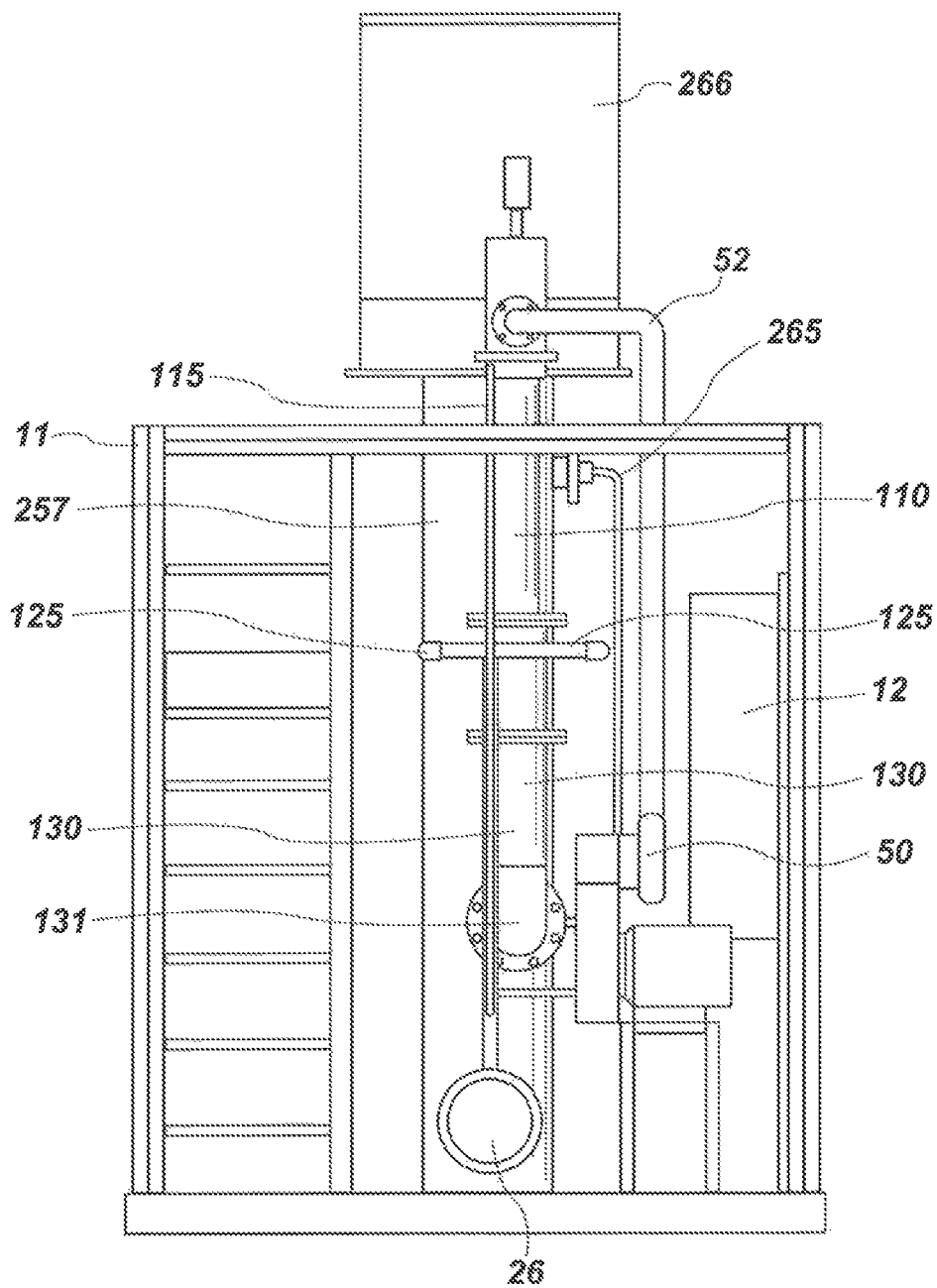
FIG. 4 is a side view of the system shown in FIG. 3.
Figure 5:
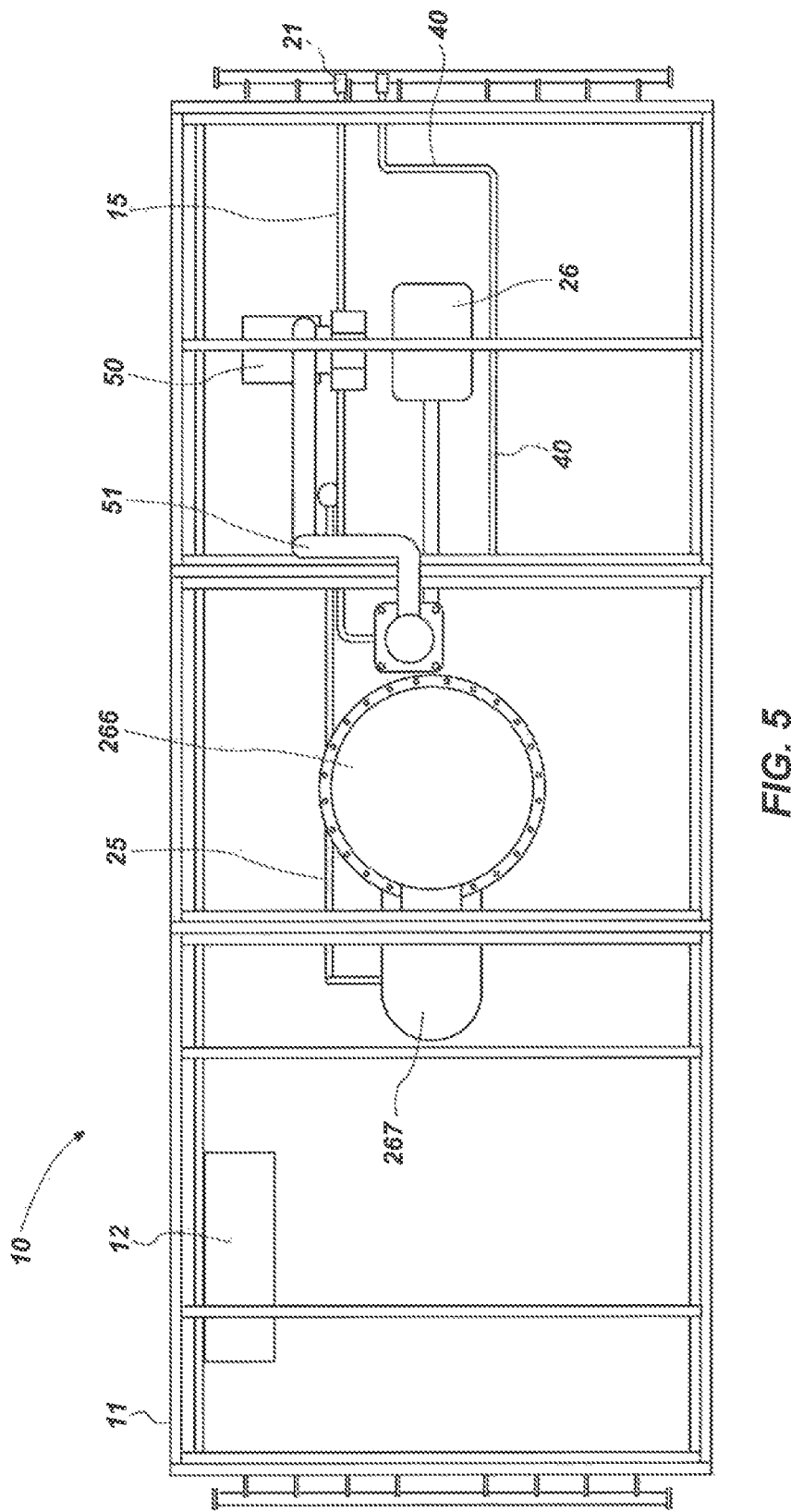
FIG. 5 is a top view of the system shown in FIG. 3.
Figure 6:
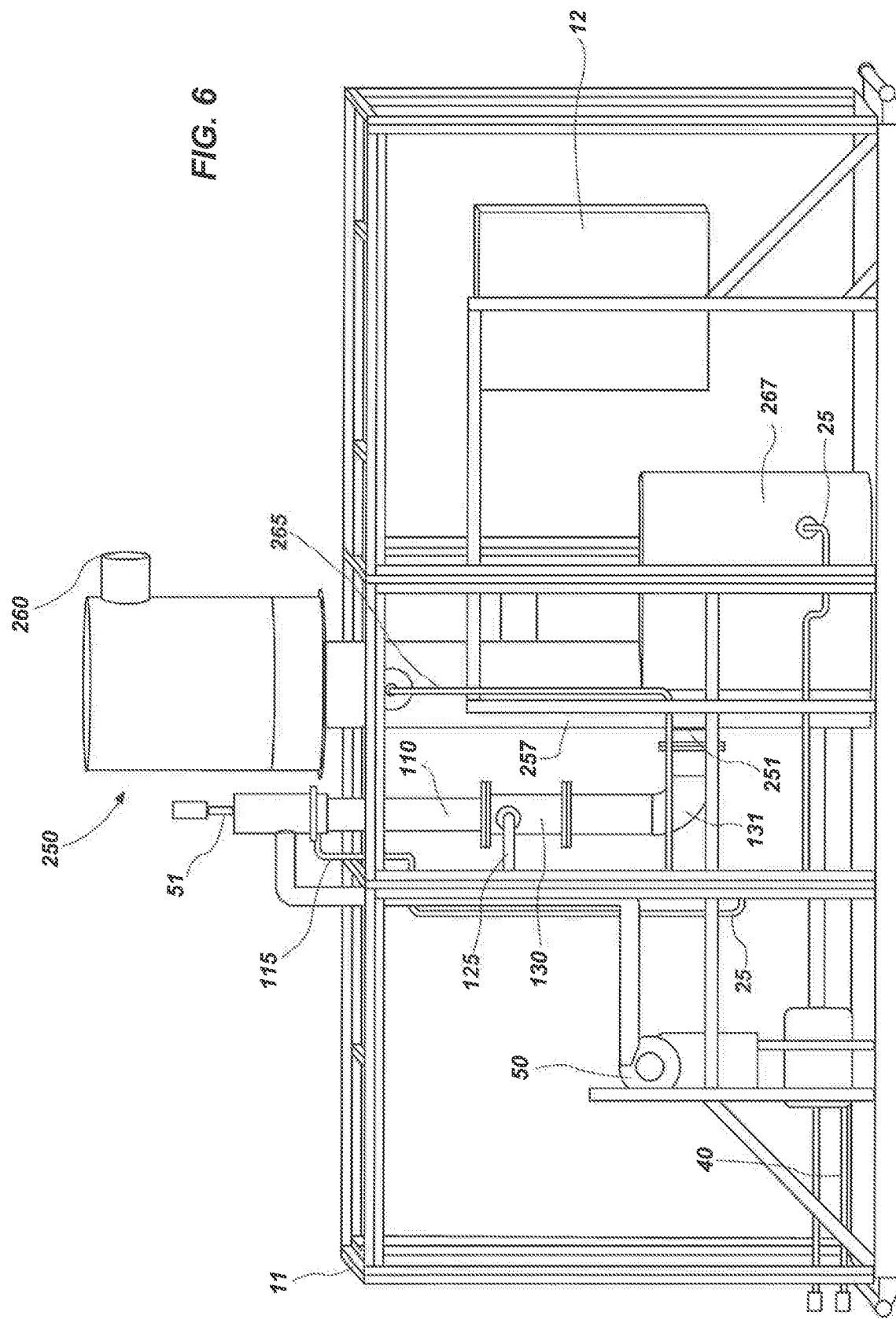
FIG. 6 is a back view of the system shown in FIG. 3.
Figure 7:
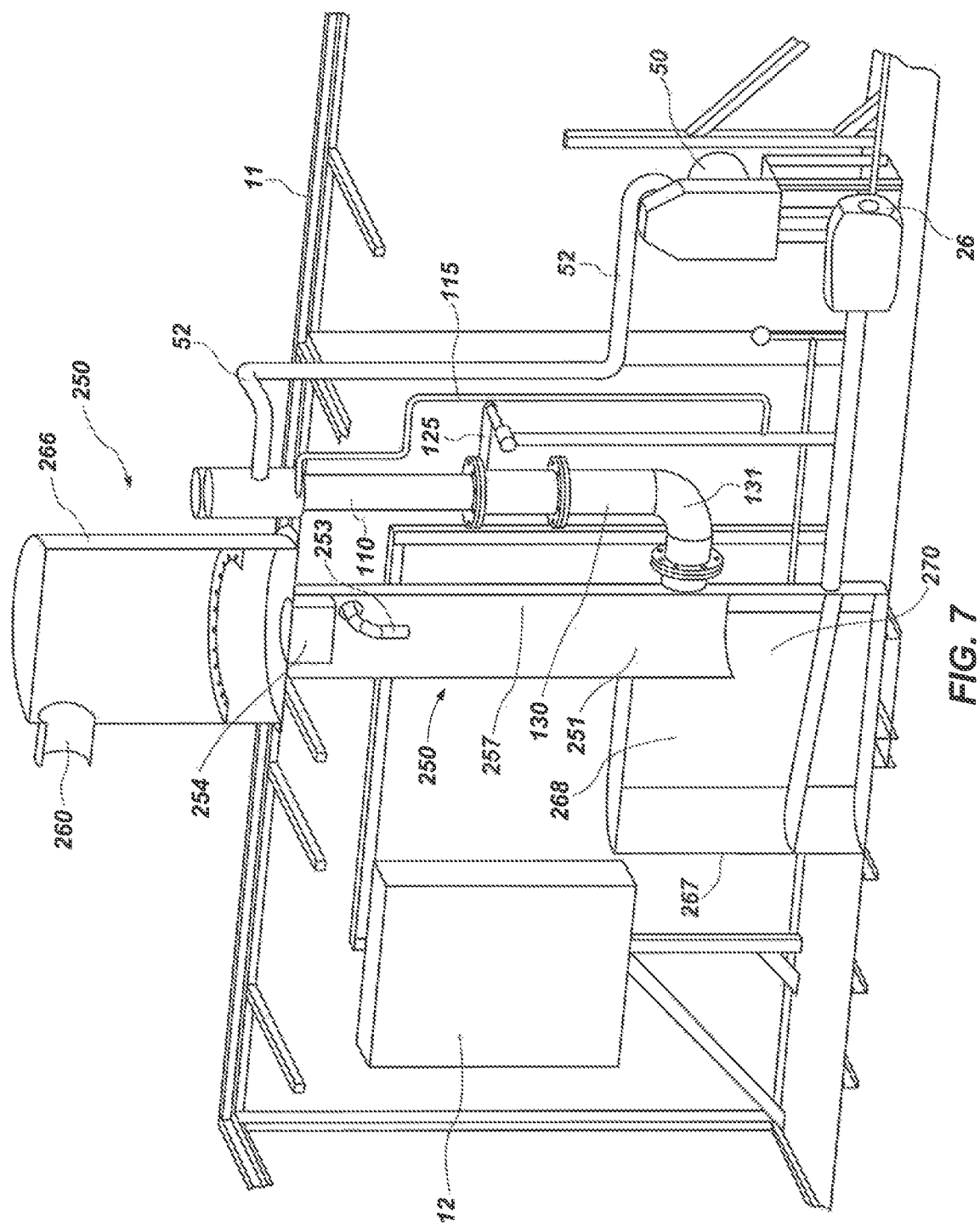
FIG. 7 is a cross sectional view of a portion of the system shown in FIG. 3.
Figure 8:
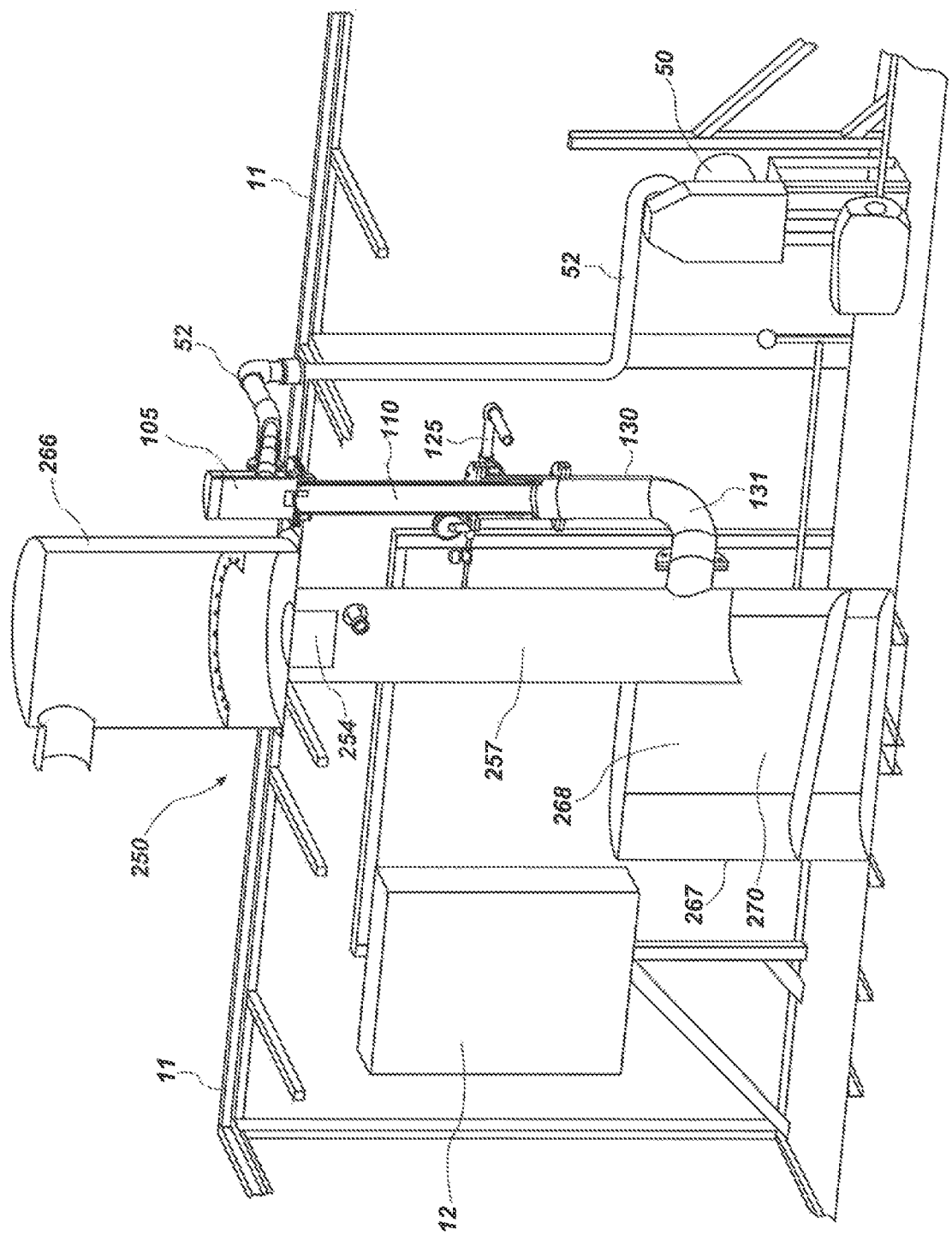
FIG. 8 is a close-up of a cross sectional view of a portion of the system shown in FIG. 3.

With reference now to FIG. 2, generally speaking, the evaporator apparatus comprises a heated gas 109 directed into a first wastewater heating chamber 110 at a predetermined temperature and velocity. The operational parameters will vary depending on the relative size of the evaporator apparatus and the volume and type of wastewater being treated. However, in one aspect of the technology, the heated gas 109 comprises an amount of ambient air that has been heated to a temperature ranging from approximately 400 to 4,000 degrees F. and is directed into a top portion 106 of a combustion chamber 105. In one aspect, the combustion gas stream 51 enters the chamber 105 from a first direction 107 while the combustion air stream 52 enters the chamber 105 from a second direction 108. The heated gas 109 is directed into the first wastewater heating chamber 110 at a velocity ranging from approximately 25 to 35 feet per second, though other velocities are contemplated for use herein depending on a particular application (e.g., 15 to 20 fps, 20 to 25 fps, and 30 to 35 fps). In one aspect of the technology, a first wastewater stream 115 is directed into the first wastewater heating chamber 110 through one or more lateral ports 111. In aspects of the technology, the sides of the lateral ports 111 are beveled or angled such that pressurized water entering there through is projected onto the internal sides of the wastewater heating chamber 110, such that the water travels in a spiral direction, coating the inner area of the chamber 110 and creating a sheet of water as it travels downwards through the chamber 110. For example, in the illustrated embodiment, the lateral port 111 comprises two elongated, rectangular, and/or angled apertures 112 or slits on opposite sides of the chamber 110. In this aspect, the chamber 110 comprises a hollow cylindrical pipe. A first aperture is angled to project water in a direction along the interior surface of the pipe and a second aperture is angled to project water in a direction along the opposite interior surface of the pipe. In accordance with one aspect of the technology, the slits are disposed at an angle that is substantially tangent to an inner surface of first waste water heating chamber 110. This enables water to be directed about the inner surface of chamber 110 in a circular and downward fashion. Depending on the flow rate at which water is directed through the aperture, the size of the aperture, and the inner diameter of chamber 110, the thickness of the fluid flow about the inner diameter of pipe may be controlled as well as the rate at which the fluid spirals down through the chamber in response to gravitational forces. As the first wastewater stream 115 spirals downward and exits the bottom of the chamber 110 it creates an annular sheet of wastewater.

In one aspect of the technology, a cooling ring 35 is disposed above the chamber 110 and below the combustion chamber 105. The cooling ring 35 is disposed above the inlet 111 and is configured to circulate a heat transfer fluid about an internal channel of the cooling ring 35 in order to cool the area about inlet 111. In this manner, the area directly surrounding the inlet 111 is not heated to a point where wastewater is flash evaporated when coming into contact with the area directly surrounding the inlet 111. In this manner, scaling in the area around inlet 111 is minimized.

In one aspect of the technology, a second wastewater heating chamber 130 is coupled to the first wastewater heating chamber 110 and in fluid communication with the first wastewater heating chamber 110. The second wastewater heating chamber 130 is configured to receive the first wastewater stream 115 as it exits a bottom portion of the first wastewater heating chamber. In one aspect, the second wastewater heating chamber 130 also comprises a hollow cylinder or pipe and is sized with an inner diameter that is larger than the inner diameter of the first wastewater heating chamber 110. A second wastewater stream 125 is directed into the second wastewater heating chamber 130 at a predetermined flow rate and mixes with the first wastewater stream 115. In one aspect of the technology, the second wastewater stream 125 is directed into the second heating chamber 130 at an angle with respect to the longitudinal axis of the second heating chamber 130 such that it intercepts the first wastewater stream 115 likewise at an angle. The second wastewater stream 125 is directed into the second wastewater heating chamber 130 at a velocity that is greater than approximately 25 percent to 80 percent, 35 to 70 percent, or 45 to 60 percent, of the velocity of the heated gas directed through the first wastewater heating chamber 110. Other ranges of velocities may also be used, for example, including 80 percent to 100 percent of the velocity of the heated gas. Advantageously, by directing the second wastewater stream 125 at an angle with respect to the first wastewater stream 115 as it exits the first wastewater heating chamber 110 at a predetermined velocity relative to the velocity of the gas directed through the heating chamber 110, the volume of water droplets formed in the second wastewater heating chamber 130 is optimized to maximize evaporation while minimizing the creation of mineralized particulates in the off-gas existing the evaporation apparatus 100. In one aspect of the technology, the water drops or water ligaments that are created in the second wastewater mixing chamber 130 (i.e., the water particles created by mixing the first and second wastewater streams) have a SMD ranging from approximately 800 to 1000 micrometers. In this manner, the surface area to volume ration of the water drops is maximized allowing a maximum amount of heat energy to be transferred to the mixed wastewater stream in order to promote evaporation of water from the wastewater stream while minimizing the generation of micro-particulate matter by flash evaporation.

In one aspect of the technology, the evaporator apparatus further comprises an evaporation stack 250 disposed adjacent the vertically oriented first and second heating chambers 110, 130. In one aspect, the evaporation stack 250 comprises a vertically oriented (i.e., having a longitudinal axis parallel with a direction of gravity) hollow cylinder. The evaporation stack 250 is in fluid communication with the second heating chamber 130 by way of an inlet port 251 located about a bottom portion of the evaporation stack 250. The inlet port 251 couples to a transition member 131 disposed about a bottom of the second heating chamber 130. In one aspect, the transition member 131 comprises a 90 degree sweeping cylinder. In one aspect of the technology, the evaporation stack 250 comprises a third wastewater stream 265 placed in a top portion of the vertical evaporation stack 250 having a downward velocity that is less than approximately 40 to 60 percent, 45 to 55 percent, or 50 percent of the velocity of the heated gas directed upwards through the evaporation stack 250 from the transition member 131. In one aspect, the downward velocity of the water droplets in the third waste stream 265 within the evaporation stack 250 is less than 35 feet per second. In one aspect, the third wastewater stream 265 comprises a downward velocity that is greater than approximately 50 percent and less than approximately 75 percent of the velocity of the heated gas entering the evaporation stack from the transition member 131. In one aspect of the technology, the evaporation stack 250 comprises a nozzle 253 disposed in a top portion of the stack directing the third wastewater stream 265 downward through a third heating chamber 257. The nozzle is configured to propagate the third wastewater stream 265 in a manner that creates water droplets having a SMD ranging from 800 to 1000 micrometers. In other aspects, the SMD range of the droplets ranges from 600 to 800 micrometers, 800 to 1100 micrometers, and 1000 to 1400 micrometers. A top portion of the stack 250 also comprises a mist eliminator 254 and sub-micron mist eliminator 255. Treated water vapor that has been evaporated from the first, second, and third wastewater streams 115, 125, 265 is propagated out the top 266 of the stack 250. A bottom portion of the stack comprises a brine collection reservoir 270. The brine collection reservoir 270 is coupled to the wastewater recycling or concentrated stream 25 and a brine discharge stream 40. The single wastewater recycling or concentrated stream 25 is the source for the first, second, and third wastewater streams 115, 125, 265.

In accordance with one aspect of the technology, with reference generally to FIGS. 3 through 8, a system 10 at least partially enclosed within a frame 11 for concentrating wastewater (or a waste fluid susceptible to evaporation) with a heated gas is disclosed. Generally speaking, the waste fluid enters as a waste fluid stream (or feed stream). A feed pump propagates or transmits the waste fluid stream 15 into a concentrated stream 25 which can be controlled by one or more valves 21. The various pumps and control switches are controlled by a central control panel 12 which may have wireless signal receivers and transmitters therein for remote connection, monitoring, and/or operation of the system 10. The concentrated stream 25 is coupled to a recycle pump 26 which directs concentrated waste to a discharge stream 40 and also through the concentrated stream 25. The concentrated stream is ultimately directed into an evaporator apparatus 100. In one aspect of the technology, the concentrated stream 25 is separated into three distinct streams directed to discrete components of the evaporator apparatus 100, though in certain aspect of the technology the concentrated stream may be limited to one stream or it may comprise a plurality of streams. Three streams are shown herein to demonstrate one aspect of the technology. The three separate streams comprise a first stream 115 that are injected into a side port 111 of the evaporator apparatus 100 to create a circular or rotating flow about a first heating chamber 110. In one aspect of the technology, the first stream 115 and the first heating chamber 110 are disposed on top of a vertical heating assembly with waste fluids entering the top and being fed downward through the assembly. The first heating chamber 110, in one aspect, comprises a hollow cylinder. As fluids enter the first heating chamber 110 through side port 111 and out aperture 112, they are propelled about an interior of the cylinder coating its interior walls, spiraling downward, and being driven by a combination of gravity and the force of the heated air which is propelled or transmitted downward through a center of the cylinder which is the center the vortex created by the waste fluid spiraling about the interior of the first heating chamber 110. The fluids from the first waste stream 115 pass downward through the first heating chamber 110 and exit through the bottom of the chamber and into a second heating chamber 130.

In one aspect of the technology, the second heating chamber 130 comprises a hollow cylinder with an interior diameter that is larger than the interior diameter of the first heating chamber 110. For example, in one aspect, the interior diameter of the first heating chamber 110 ranges from 6 to 10 inches and the interior diameter of the second heating chamber ranges from 8 to 12 inches. As the first waste stream 115 enters the top of the second heating chamber 130, the fluid exhibits less of a spiraling flow, assuming more of a cone-shaped geometry in a sheet of fluid. In one aspect of the technology, a second waste stream 125 is propelled or transmitted into the second heating chamber 130 at a location near where the first waste stream 115 also enters the second heating chamber. The combined first and second waste streams are then directed into an adjacent vertical evaporation stack 250.

Water vapor is generated from the first and second waste streams as heat from the heated gas raises the temperature of the fluid and increase the rate at which water evaporates.

Evaporation is a type of vaporization of a liquid that occurs from the surface of a liquid into a gaseous phase that is not saturated with the evaporating substance. While evaporation is specifically referenced herein, at times the system vaporizes water out of the waste stream through boiling which is characterized by bubbles of saturated vapor forming in the liquid phase, though evaporation is the preferred method of vaporization in certain aspects of the technology. Water vapor that has been generated from the first and second waste streams is directed upwards and out of the vertical evaporation stack 100 through outlet 260 while the concentrated waste (i.e., the liquid waste that is not vaporized) is gravity drained into a collection reservoir 270. As heated air that has traveled through both the first and second heating chambers is directed through the evaporation stack 250, a third waste stream 265 (also being derived from the recycling stream 25) is directed to a top of the third heating chamber 257 within the evaporation stack 250 and downward through a nozzle 253. Within the third heating chamber 257, additional water vapor is generated through evaporative forces and heated air mixes with the waste fluid from the third waste stream 265. The water vapor generated from the third waste stream 265 joins the water vapor generated from the first and second waste streams 110, 125 and exits the evaporation stack through outlet 260. The waste fluid from the third waste stream 265 that is not evaporated falls to the bottom of the evaporative stack and is collected in the reservoir 270 where it is disposed of through a brine discharge 40 or placed in the recycling stream 25 for further concentration and treatment. In one aspect of the technology, the nozzle 253 is configured to propagate or transmit the third waste stream 265 downward at a velocity that is greater than approximately 50 percent and less than approximately 75 percent of the velocity of the heated gas traveling upward through the third heating chamber 257. For example, in one aspect, the third wastewater stream 265 is directed through nozzle 253 at a flowrate ranging from 35 to 45 gallons per minute (gpm) and 40 pounds per square inch (psi). The orifice of the nozzle 253 is sized such that the SMD of water droplets or water ligament emanating from the nozzle 253 ranges from 800 to 1000 micrometers. The height of the different heating chambers discussed herein is a function of the relative volume and type of wastewater fluid being treated therein. In some applications, the height of the first heating chamber 110 ranges from 3 to 6 feet the second heating chamber ranges from 4 to 8 feet, and the third heating chamber ranges from 6 to 10 feet. It is understood, however, that the height of each may be adjusted, proportionally or otherwise, as suits a particular application.

In one aspect of the technology, the inner diameter of the third heating chamber 257 is less than an inner diameter of an upper portion 266 of the stack 250, though in some aspects the inner diameters of the two are substantially equal. A mist eliminator 254 is disposed within the evaporative stack 250 above the nozzle 253. In other aspects, a sub-micron mist eliminator is disposed with the upper portion 266 of the stack 250. In one aspect, the reservoir 270 comprises an inner diameter and/or volume that is larger than the inner diameter and/or volume of the third heating chamber 257. In one aspect, a bottom portion 267 of stack 250 comprises a reservoir 270 as well as a mixing chamber 268. The mixing chamber 268 comprises a zone where concentrated waste fluid exits the transition member 131 in a first direction that is normal to the direction that waste fluid exiting the third heating chamber 257. Heated air exiting the transition member 131 enters the mixing chamber 268 and is circulated within the mixing chamber 268. The two waste fluids from the two heating chambers may be subjected to further evaporative forces within the heating chamber 257 as heated air flow within the mixing chamber moves upward through the heating chamber 257 and out exhaust port 260.

Figure 9:
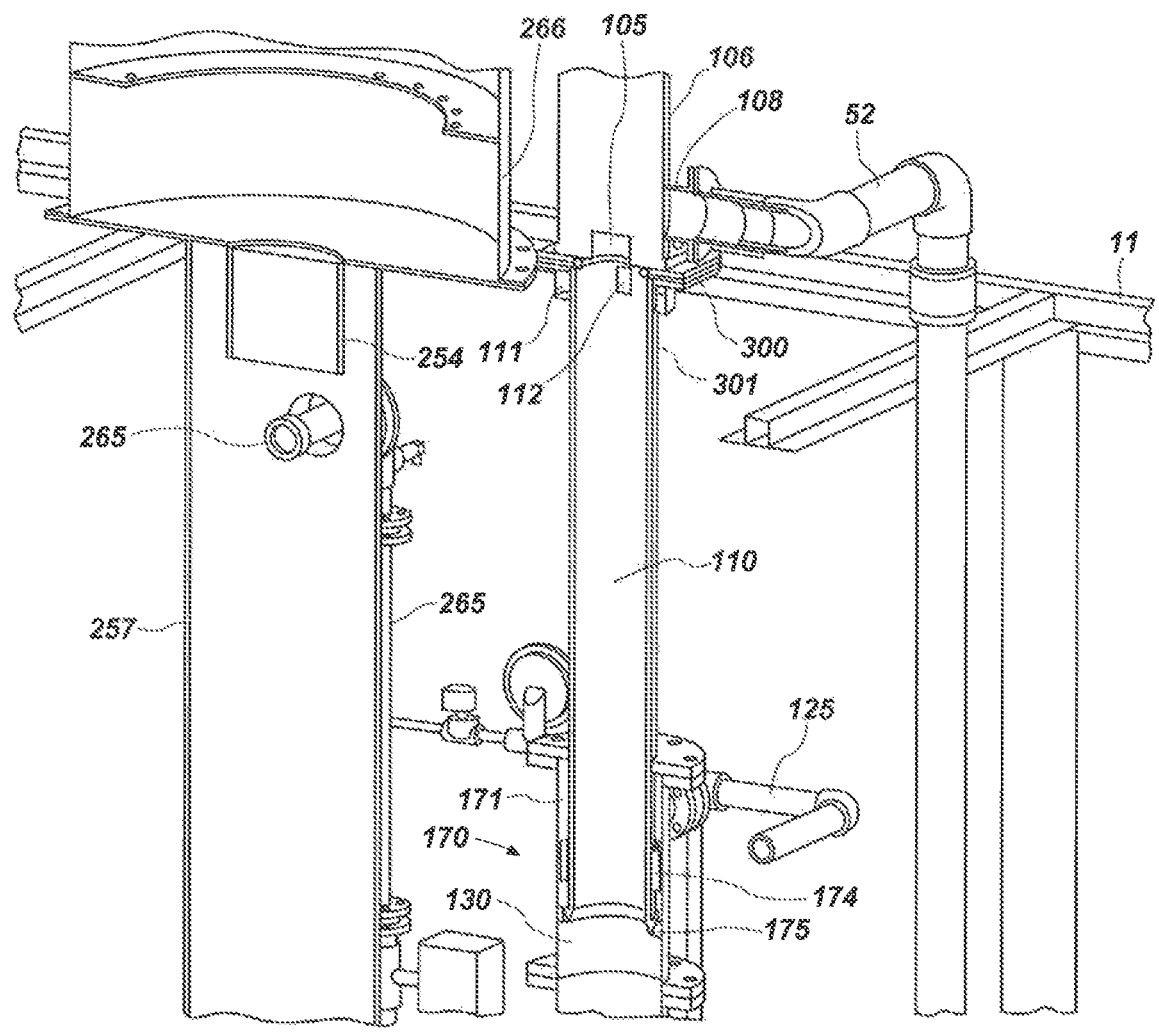
FIG. 9 is a close-up of a cross sectional view of a portion of the system shown in FIG. 3.
Figure 10:
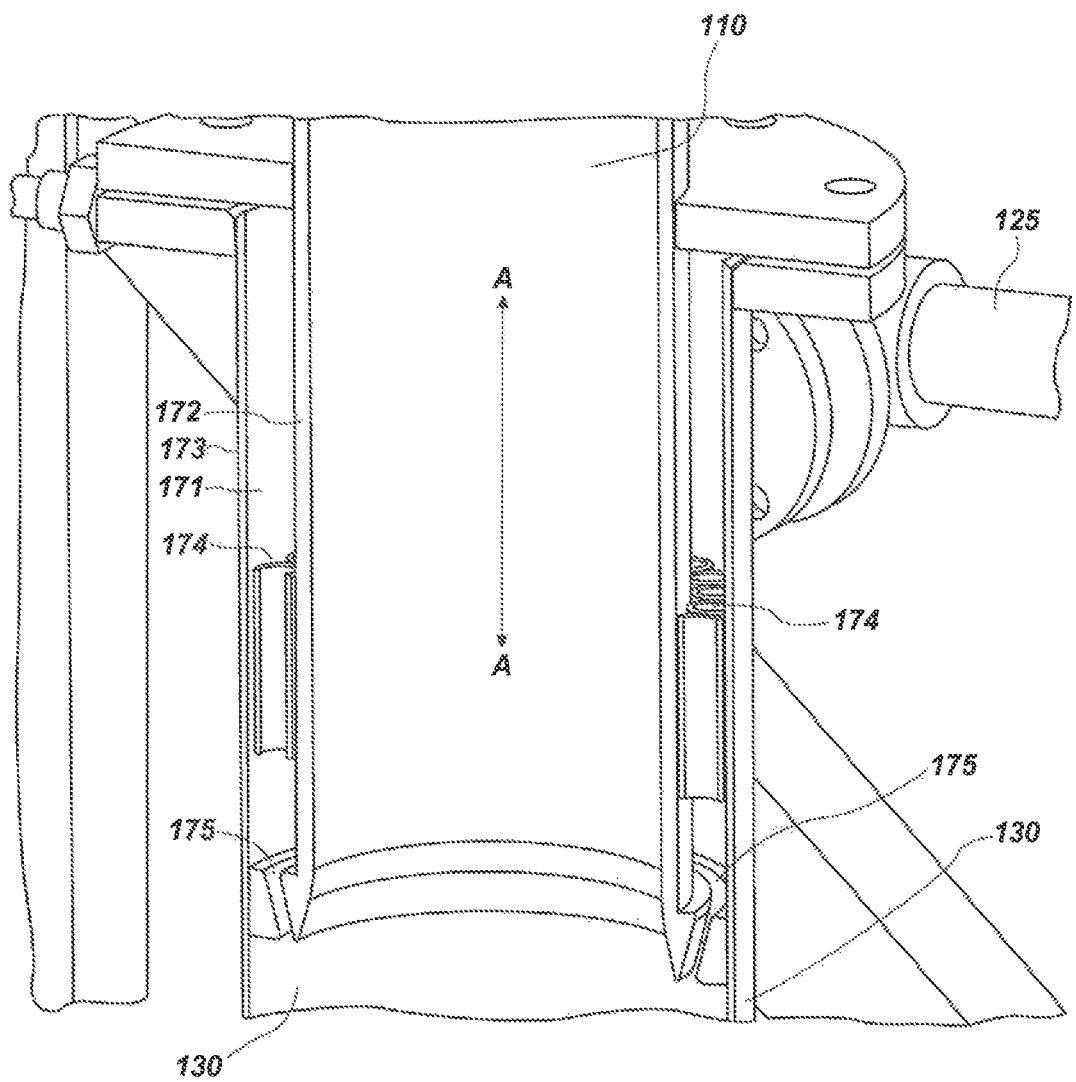
FIG. 10 illustrates an internal portion of the system shown in FIG. 3.
Figure 11:
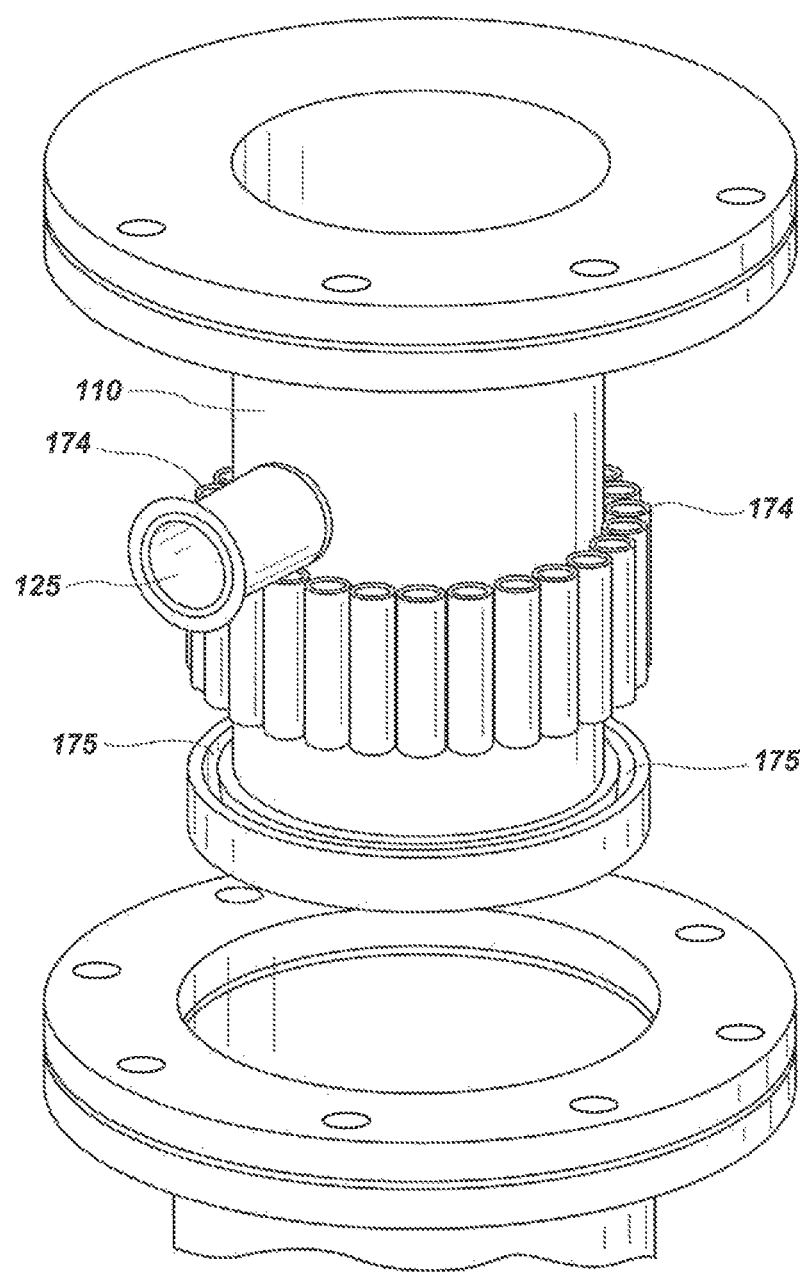
FIG. 11 is a top perspective view of a portion of a cooling plate in accordance with one aspect of the technology.

With reference now to FIGS. 9 through 11, in accordance with one aspect of the technology, a "smooth flow" assembly 170 is disclosed. The smooth flow assembly 170 receives the second wastewater stream 125 and propagates the stream into the second heating chamber 130 where it intercepts the first wastewater stream 115 in a manner that converts the first wastewater stream 115 into a plurality of water drops or ligaments having a SMD ranging from approximately 800 to 1000 micrometers. While this range (800 to 1000 micrometers) is provided herein, it is understood that it is not an absolute volume number. Meaning, not all water drops or water ligaments within the second heating chamber 130 will have a SMD ranging from approximately 800 to 1000 micrometers. Rather, a mean of the water drops or ligaments have the proscribed SMD as implied by the term "mean" within SMD thereby maximizing evaporation of the wastewater stream within the second heating chamber 130. While a SMD of approximately 800 to 1000 micrometers is specifically referenced, in other aspects of the technology, numerous different ranges are possible as noted elsewhere in this disclosure. In one aspect of the technology, the pressure of the first wastewater stream ranges from approximately 2 to 5 psi and the pressure of the second wastewater stream ranges from approximately 0.5 to 4 psi.

In one aspect of the technology, the smooth flow assembly 170 comprises an annular channel 171 between an outer wall 172 of the first heating chamber 110 and an inner wall 173 of a portion of the cylinder comprising the second heating chamber 130. The annular channel 171 need not share a wall with the same cylinder that comprises the second heating chamber 130 in every aspect of the technology, but does so in the aspect shown on FIGS. 9-11. The annular channel 171 contains a plurality of cylinders 174 that are placed side-by-side within the channel 171 around the circumference of the channel 171. The second wastewater stream 125 enters the annular channel 171 above the plurality of cylinders 174. Advantageously, the plurality of cylinders assists in evenly distributing the wastewater stream 125 about the interior of the annular channel 171 before flowing into a nozzle 175. While a plurality of cylinders 174 are disclosed that are side-by-side, it is understood that different shaped hollow members (i.e. square, rectangular, triangular, oval, etc.) for distributing the wastewater stream 125 about the interior space or between the first heating chamber 110 and inner wall 173. The hollow members also need not be placed side-by-side. That is, spaces between the hollow members can be present so long as the objective of evenly distributing the wastewater flow 125 is achieved. Likewise, in one aspect of the technology, the annular channel does not have any hollow members therein. Rather, the wastewater flow 125 flows unencumbered directly to the nozzle 175.

In one aspect of the technology, the nozzle 175 comprises an annular nozzle 175 surrounding the first heating chamber 110. The annular nozzle 175 is configured to propagate the second wastewater stream 125 into the top of the second heating chamber 130, intercepting the first wastewater stream 115 as it enters the top of the second heating chamber. In one aspect, the nozzle 175 comprises an annular angled channel. The annular angled channel directs the second wastewater stream 125 inward from the inner wall 173 of the second heating chamber 130 forming a cone-shaped sheet or spray of wastewater that intercepts the first wastewater stream 115. Advantageously, as the second wastewater stream 125 intercepts the first wastewater stream 115, the two streams mix to form a plurality of water drops or water ligaments having a SMD ranging from approximately 800 to 1000 micrometers. As the mixed streams travel downward through the second heating chamber 130, water vapor (or other volatile compounds) is extracted from the waste stream leaving dissolved solids or other non-volatile compounds within the waste stream. This results in a waste stream having concentrated dissolved solids or other non-volatile compounds in the waste stream.

In one aspect of the technology, the first heating chamber 110 is concentric with the second heating chamber 130. The annular angled channel 176 is oriented at an angle ranging from 10 to 80 degrees with respect to a longitudinal axis "A" of both the first heating chamber 110 and second heating chamber 130. The nozzle 175 need not be an annular nozzle. In one aspect, the nozzle 175 comprises a plurality of angled nozzles surrounding the area where the first wastewater stream 115 enters the second heating chamber 130 configured to propagate the second wastewater stream into the second heating chamber 130 so long as the flow of the second wastewater stream 125 is propagated at a flow rate that results in the creation of water droplets or water ligament having a SMD ranging from approximately 800 to 1000 micrometers (or other SMD as suits a particular application).

Figure 12:
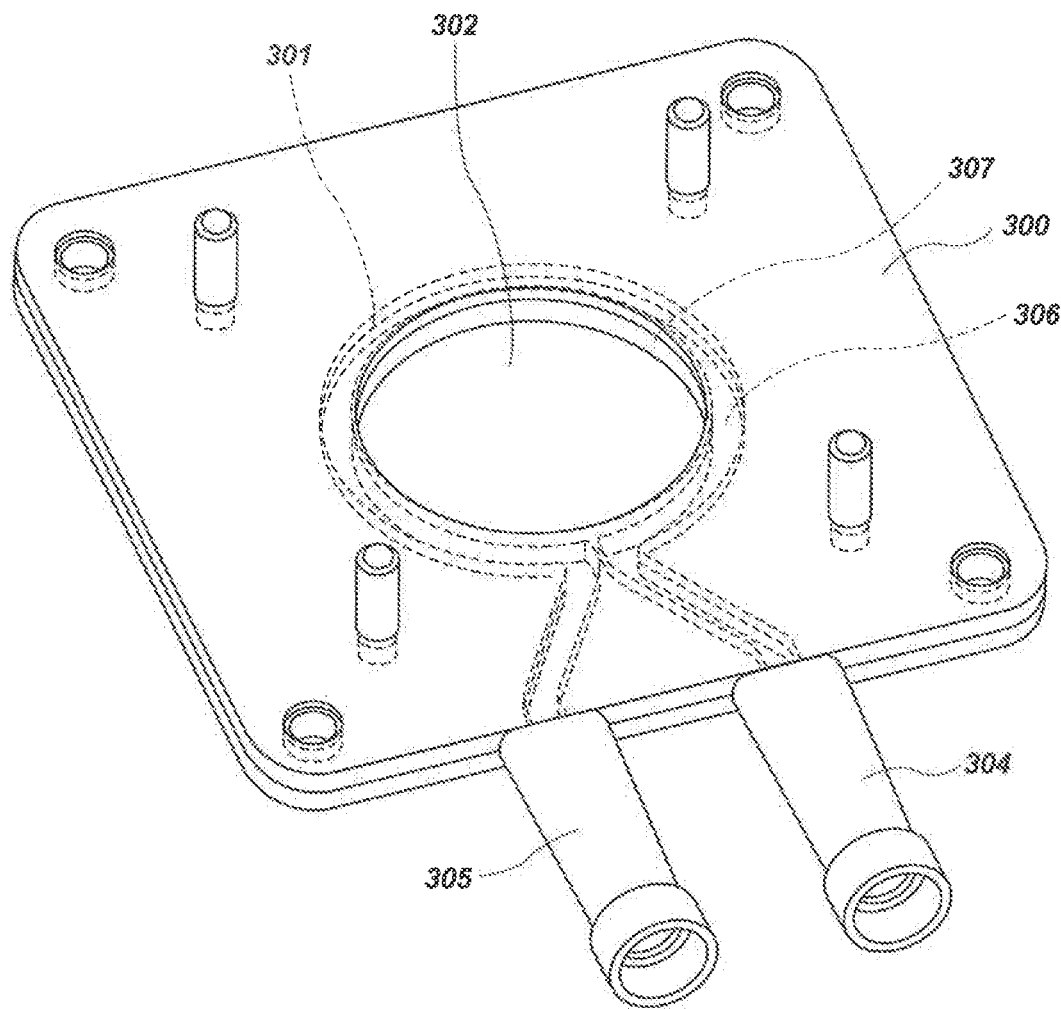
FIG. 12 is a cross-sectional view of a portion of the system shown in FIG. 3.

With reference to FIGS. 9 and 12, generally, in one aspect of the technology, a cooling plate 300 is disposed between inlet port 111 of the first heating chamber 110 and the bottom outlet of combustion chamber 105. The cooling plate 300 comprises a channel 301 that surrounds an opening or through-hole 302 in the cooling plate 300. A heat transfer fluid is circulated through the channel 301 by way of fluid inlet 304 and outlet 305. The heat transfer fluid is circulated to an outside heat exchanger by way of a pump where heat is removed from the transfer fluid. In one aspect, the heat transfer fluid comprises water, ethylene glycol, diethylene glycol, propylene glycol, mineral oil, silicone oil, or combinations of the foregoing. The opening 302 and width of channel 301 are sized to approximate the inner diameter of the first heating chamber 100. As the first wastewater stream 115 passes though inlet port 111 and apertures 112, the proximity of the wastewater stream 115 to the heated gas 109 emanating from the combustion chamber 105 results in flash evaporation of parts of the first wastewater stream 115. This can cause accumulation of scale about apertures 112. The bottom side of base 306 and outer wall 307 of the heat transfer channel 301 are in contact with the heated gas 109 as it emanates from the combustion chamber 105 and also represent surfaces most likely to have splash from the first wastewater stream 115 as it exits the apertures 112 and enters the first heating chamber 110. Because the bottom side of base 306 and outer wall 307 are cooled, the formation of scale on those surfaces is minimized. Other surfaces near the outlet of the combustion chamber 105 are covered with a layer of wastewater fluid preventing the buildup of scale on those surfaces.

Figure 13:
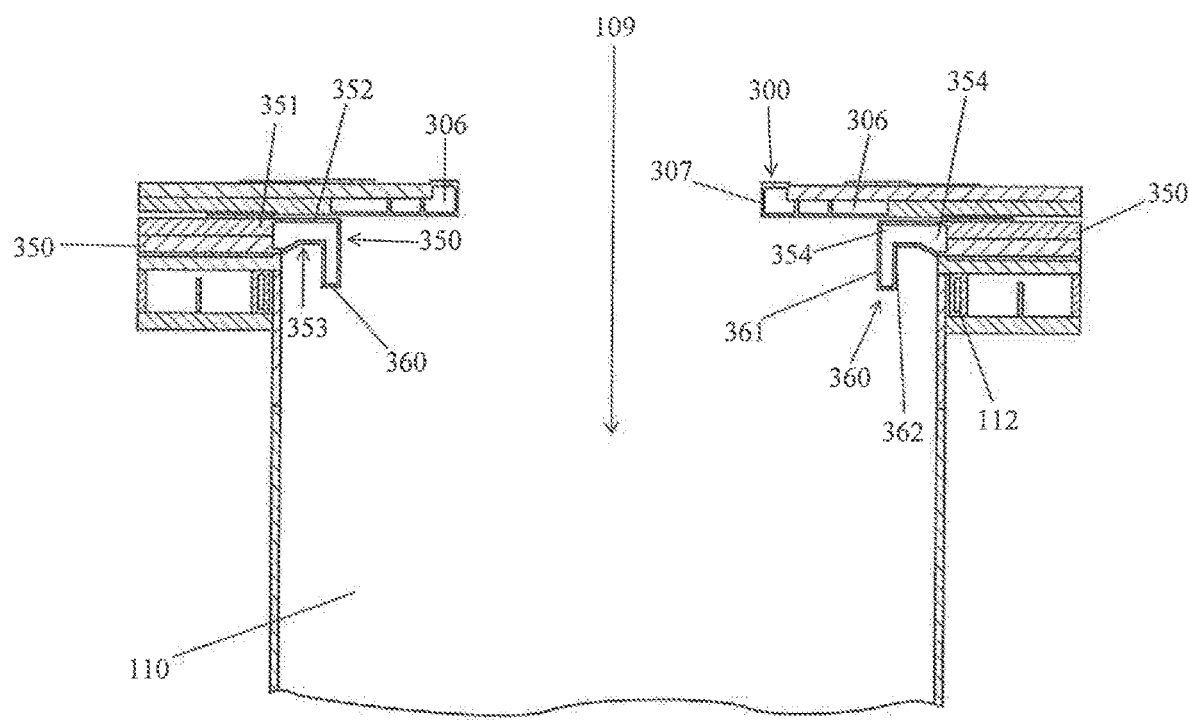
FIG. 13 is a cross-sectional view of a system for purifying a waste stream in one aspect of the technology.
Figure 14:
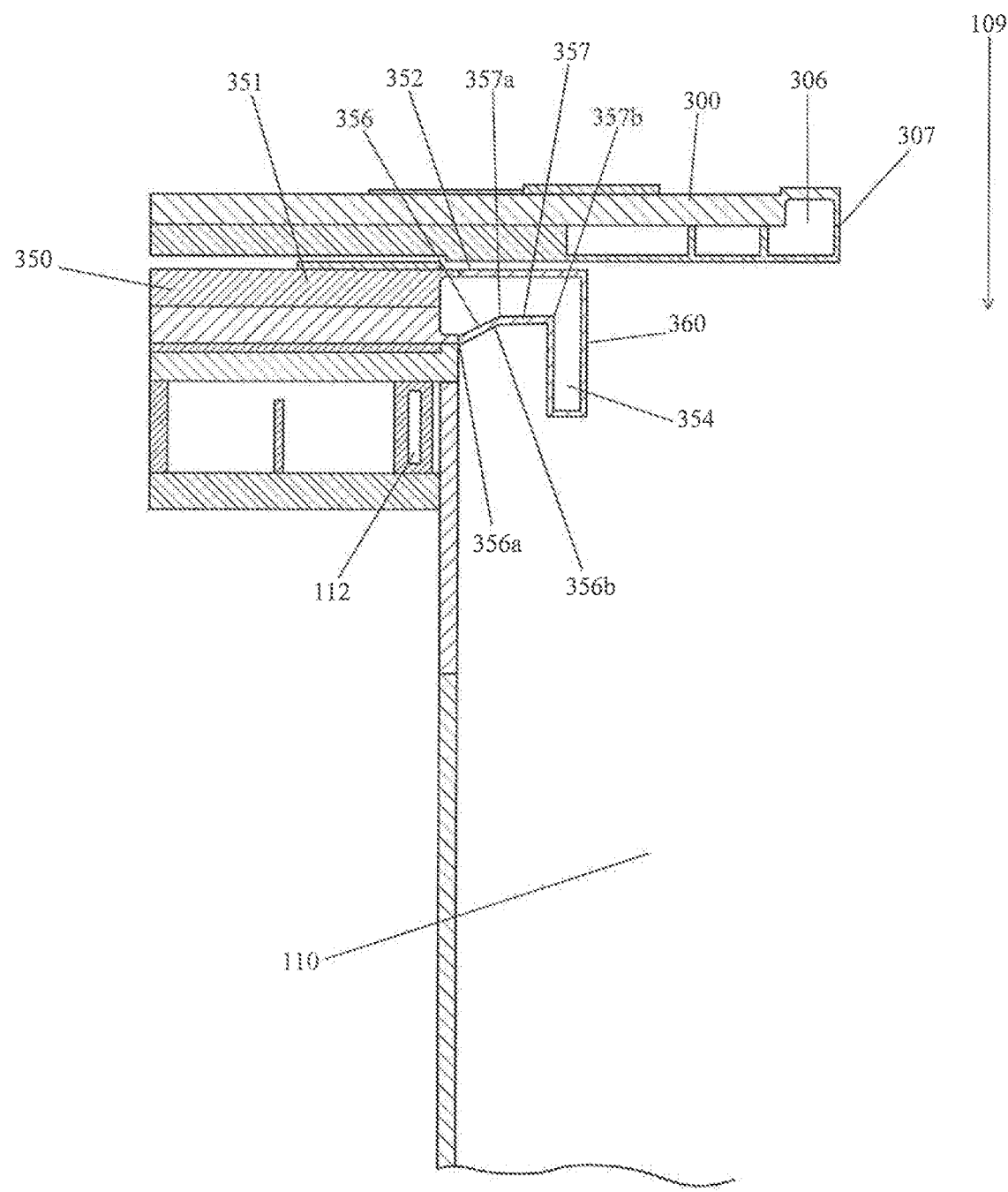
FIG. 14 is a close up of one side of the cross-sectional view of FIG. 13.
Figure 15:
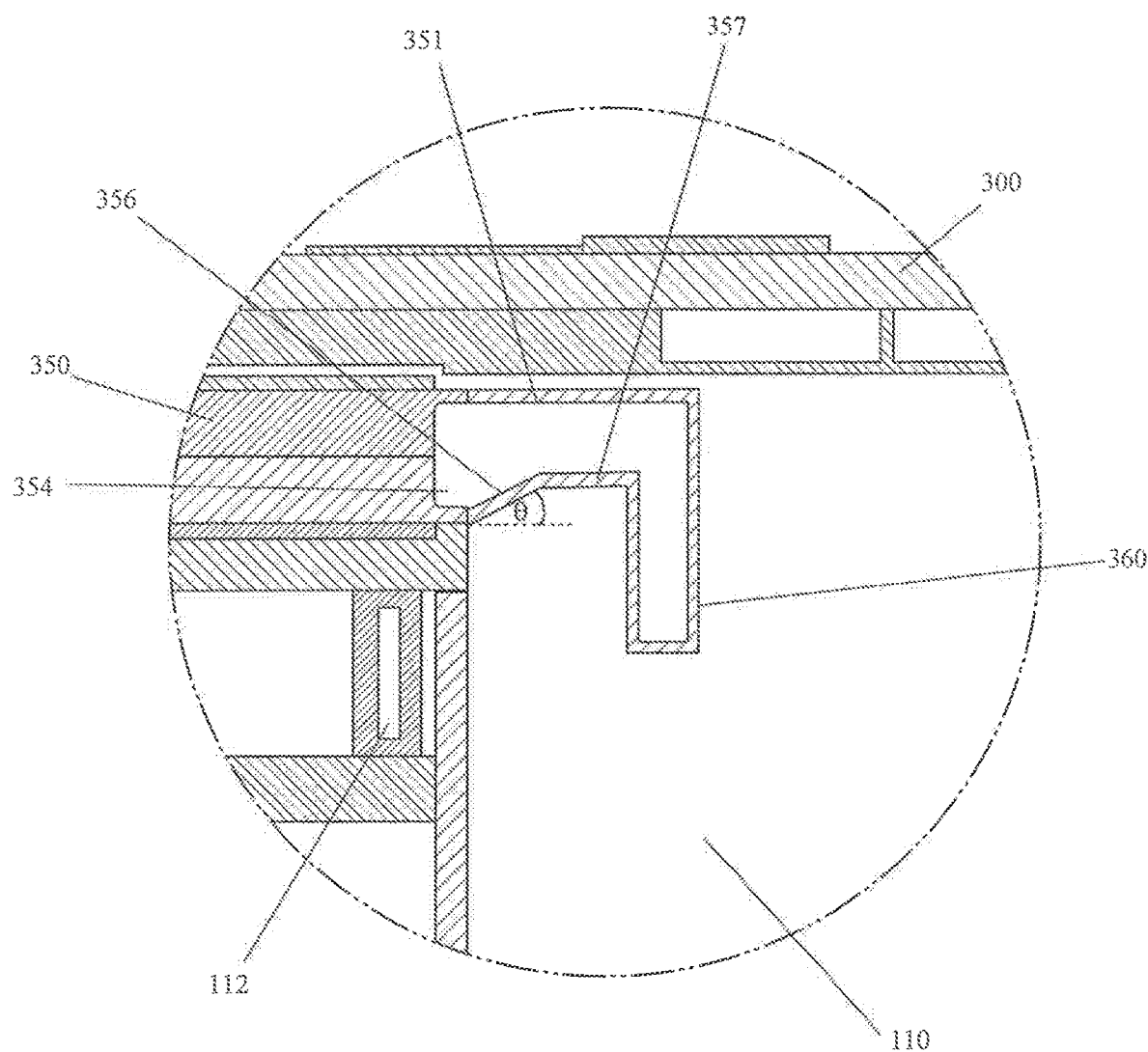
FIG. 15 is an enlarged view of a portion of FIG. 14.

With further reference to FIGS. 13 and 14, in another aspect of the technology an additional cooling apparatus 350 (or cooling apron) is utilized to minimize the accumulation of scale. Generally, in one aspect of the technology, a cooling apron 350 is disposed above aperture 112 of the first heating chamber 110 and the bottom outlet of combustion chamber 105. It can be disposed beneath the cooling plate 300 or used by itself without the cooling plate 300.

In accordance with one aspect of the technology, heated gas 109 exiting combustion chamber can form small amounts of scale where the cooling plate 300 and first heating chamber 110 intersect. The small amounts of scale can accumulate over time. The cooling apron 350 is configured with a geometry that minimizes the formation of scale. In one aspect of the technology, the cooling apron 350 comprises a top ring 351 having a top surface 352 and a bottom surface 353. A distal end of the top ring comprises an annular lip 360 extending downward beyond the bottom surface 353 of the top ring 351 that further acts a shield. The cooling apron 350 comprises a void 354 in fluid communication with a heat transfer fluid that is circulated about a portion of the cooling apron 350. As with the cooling plate 300, the heat transfer fluid is utilized to remove heat from the cooling apron 350 in an effort to minimize the formation of scale. In one aspect of the technology, the void 354 within the cooling apron 350 extends to within the annular lip 360 and into the top ring 351 in such a manner that when the cooling apron 350 is fitted about the top of the first heating chamber 110, the void 354 extends inward beyond the internal sidewall of the first heating chamber 110. In this manner, the bottom surface 353 of the top ring 351 is cooled and the intersection between the cooling apron 350 and the internal sidewall of the first heating chamber 110 is also cooled.

In one aspect of the technology, the bottom surface 353 of the cooling apron top ring 351 comprises a first section 356 that couples to an internal side surface of the first heating chamber 110 and a second section 357 that couples to an internal side surface of the lip 360. The first section 356 is oriented at an angle ranging from between 15 and 45 degrees from an imaginary plane normal to a direction of gravity passing through the side of the first heating chamber 110. The first section 356 extends upward and away from the sidewall of the first heating chamber 110. In one aspect, the second section 357 is parallel to an imaginary plane normal to a direction of gravity and couples to the lip 360 at a right angle. However, in another aspect of the technology, the second section 357 is oriented at an angle ranging from between 15 and 45 degrees from an imaginary plane normal to a direction of gravity passing through the sidewall of the first heating chamber 110. The second section 357 extends downward and towards the lip 360 and couples to the lip 360 at an angle ranging from between 15 and 45 degrees. In one aspect, the first section 356 comprises a first end 356a coupled to an internal side surface of the first heating chamber 110 and a second end 356b coupled to a first end 357a of the second section 357. The second section 357 comprises a first end 357a coupled to the second end 356b of the first section 356 and a second end 357b coupled to the lip 360.

As noted herein, waste water is injected into the first heating chamber 110 in such a manner that the waste water forms a vortex about the interior sidewall of the first heating chamber 110. The opening within the vortex allows for a source of heated gas 109 to be in contact with the waste water and evaporate water from the waste water stream thereby concentrating the waste stream and reducing the amount of waste for disposal. The waste water is injected into chamber 110 in such a way that a minimum thickness about the side wall within heating chamber 110 is maintained in order to minimize the formation of scale. However, as waste water exits apertures 112 (i.e., the tangential inlets) and enters the first heating chamber 110, the waste water can creep upward above the aperture 112 due to the centrifugal forces acting on the waste stream. Advantageously, the geometry of the bottom surface 353 of the top cooling ring 351 minimizes thinning of the waste water "creep" thereby minimizing the formation of scale about the cooling apron 350. That is, the geometry of the bottom surface 353 creates an environment whereby the "creep" maintains a thickness that is not prone to flash evaporation. The lip 360 further shields the waste water stream from turbulence and other forces created by heated gas 109 entering the first heating chamber 110 which also minimizes flash evaporation and the creation of scale about internal components of the system.

In accordance with one aspect of the technology, the top surface 352 of the cooling apron ring 351 is substantially planar. The lip 360 comprises a substantially annular ring disposed normal to the top surface 352 of the cooling apron top ring 351. The lip 360 comprises a pair of opposing sidewalls 361, 362 that extend downward and through an imaginary plane extending from a top of the waste water apertures 112 normal to an internal side wall of the first heating chamber 110 and parallel to a direction of gravity. The opposing sidewalls comprise an outside wall 361 and an inside wall 362 that are substantially planar. In one aspect of the technology, the distance between the sidewall of the first heating chamber 110 and the inside wall 362 of lip 360 is about ¾ inch, however that distance can be greater or less than ¾ inch depending on the volume of waste water flow and internal diameter of the first heating chamber 110. In one aspect, the lip 360 extends downward about 2 inches from the top surface 352 of the cooling apron top ring 351. That dimension too, can be greater than or less than 2 inches depending on the volume of waste water flow and internal diameter of the first heating chamber 110.

In accordance with one aspect of the technology, a method of treating wastewater fluid with a heated gas is disclosed. The method comprises placing a first wastewater stream at a first velocity into a cylindrical vertical heating chamber through an inlet, forming a sheet of wastewater within the vertical heating chamber. In one aspect, that sheet comprises a downward-shaped cone of wastewater having a center that is concentric with the vertical heating chamber. The method also comprises heating a gas to 400 to 4000 degrees F. and placing a volume of the heated gas downward through a center of the sheet or cone of wastewater at a second velocity, wherein the second velocity is less than the first velocity. This aspect of the method relates to the cone or sheet created by annular valve 175. The method further comprises creating a flow of wastewater drops or water ligaments within the cylindrical vertical heating chamber comprising a SMD ranging from approximately 800 to 1000 micrometers. In one aspect, the method further comprises first and second wastewater streams, wherein the first wastewater stream is directed to the cylindrical vertical heating chamber via annular valve 175 and the second wastewater stream is directed to a vertical evaporation stack 250 via nozzle 253. The vertical evaporation stack 250 is in fluid communication with the cylindrical vertical heating chamber 130 and the SMD of the water drops or water ligaments of the second wastewater stream downward through vertical evaporation stack ranges from approximately 800 to 1000 micrometers. In one aspect, the velocity of the second wastewater stream moving downward within the vertical evaporation stack 250 is greater than approximately 30 percent of the velocity of the heated air traveling from the vertical heating chamber 130 into the vertical evaporation stack 250.

In another aspect of the technology, a third wastewater stream is disposed through a center of the sheet or cone of the first wastewater stream. The first stream of wastewater is placed into the vertical heating chamber through an angled annular inlet to mix with the third wastewater stream. Each of the wastewater streams are subject to evaporative forces from the heated gas. Volatile components of the wastewater streams are evaporated and discharged through an outlet about a top of the evaporation stack. Non-volatile components of the wastewater streams are collected in a reservoir at the bottom of the evaporation stack and discharged into a recycling stream to be further processed by the system and/or disposed of.

In another aspect of the technology, a method of minimizing scale through the use of a cooling apron 350 is disclosed. The method comprises placing a cooling apparatus above a tangential waste water inlet. The cooling apparatus having a bottom surface with an upwardly angled first section 356 at angle theta ($\theta$) with respect to the sidewall of chamber 110 and coupled to a second section 357. The second section 357 is coupled to a lip 360 that hangs downward from a top ring 351 of the cooling apparatus 350. The method also comprises placing a first wastewater stream at a first velocity into a cylindrical vertical heating chamber through the tangential inlet, forming a sheet of wastewater within the vertical heating chamber as wastewater is circulated about the sidewall of the heating chamber. The method further comprises minimizing thinning of the wastewater sheet above the tangential inlet.

It is noted that no specific order is required in these methods unless required by the claims set forth herein, though generally in some embodiments, the method steps can be carried out sequentially.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for concentrating wastewater with a heated gas, comprising:
   a hollow member having a longitudinal axis that is parallel with a direction of gravity, said hollow member comprising a wastewater inlet;
   a source of heated gas disposed about the hollow member and above the wastewater inlet, said source of heated gas configured to propagate heated gas into a center of the hollow member;
   a cooling apron coupled to the hollow member and disposed above the wastewater inlet and below the source of heated gas, said cooling apron comprising a top surface, a bottom surface, and a lip, wherein the lip extends downward beyond the bottom surface of the apron.

2. The apparatus of claim 1, wherein a void within the cooling apron is in fluid communication with a heat transfer fluid that is circulated about a portion of the cooling apron.

3. The apparatus of claim 1, wherein the bottom surface of the cooling apron comprises a first section that couples to an internal side surface of the hollow member and a second section that couples to an internal side surface of the lip.

4. The apparatus of claim 3, wherein the first section is oriented at an angle ranging from between 15 and 45 degrees from an imaginary plane normal to a direction of gravity passing through the hollow member, said first section extending upward and away from the hollow member.

5. The apparatus of claim 3, wherein the first section comprises a first end coupled to the internal side surface of the hollow member and a second end coupled to a first end of the second section, the second section comprising a first end coupled to the second end of the first section and a second end coupled to the lip.

6. The apparatus of claim 5, wherein the second section is parallel to an imaginary plane normal to a direction of gravity.

7. The apparatus of claim 5, wherein the second section is oriented at an angle ranging from between 15 and 45 degrees from an imaginary plane normal to a direction of gravity passing through the hollow member, said second section extending downward and towards the lip.

8. The apparatus of claim 1, wherein the top surface of the cooling apron is substantially planar.

9. The apparatus of claim 1, wherein the lip comprises an annular ring disposed normal to the top surface of the cooling apron.

10. The apparatus of claim 1, wherein the lip extends downward and through an imaginary plane extending from a top of the wastewater inlet normal to a side surface of the hollow member and parallel to a direction of gravity.

11. The apparatus of claim 1, wherein a void within the cooling apron extends inward beyond an internal sidewall of the hollow member.

12. The apparatus of claim 1, wherein the lip comprises an outside wall and an inside wall that are planar.

13. An apparatus for concentrating wastewater with a heated gas, comprising:
   a cylindrical hollow member having a longitudinal axis, said cylindrical hollow member comprising a wastewater inlet disposed about the cylindrical member hollow member;
   a source of heated gas about the cylindrical hollow member and configured to propagate a heated gas about the wastewater inlet;
   a cooling plate comprising a ring disposed about the cylindrical hollow member between the wastewater inlet and the source of heated gas, said cooling plate comprising a top surface and a bottom surface.

14. The apparatus of claim 13, wherein the cooling plate comprises a circular void disposed about a center of the plate.

15. The apparatus of claim 14, wherein the cooling plate comprises an annular ring disposed about the circular void, the annular ring coupled to a cooling fluid inlet on a first end and a cooling fluid outlet on a second end.

16. The apparatus of claim 15, comprising a cooling apron disposed beneath the cooling plate, the cooling apron comprising an annular lip.

17. The apparatus of claim 16, wherein the circular void disposed about a center of the cooling plate comprises a perimeter that is less than a perimeter of the annular lip.

18. An apparatus for concentrating wastewater with a heated gas, comprising:
   a wastewater inlet;
   a source of heated gas disposed about the wastewater inlet;
   a cooling apparatus disposed between the wastewater inlet and the source of heated gas, the cooling apparatus comprising a cooling plate disposed atop a cooling apron, each of the cooling plate and cooling apron comprising:
      a circular opening configured to pass the heated gas therethrough; and
      a cooling fluid channel.

19. The apparatus of claim 18, wherein the cooling fluid channel of the cooling plate is disposed about the circular opening of the cooling plate.

20. The apparatus of claim 18, wherein the cooling fluid channel of the cooling apron is disposed about a lip of the cooling apron.

* * * * *